(12) United States Patent
Kwon et al.

(10) Patent No.: US 9,389,735 B2
(45) Date of Patent: Jul. 12, 2016

(54) TOUCH SENSING DEVICE AND TOUCHSCREEN DEVICE

(71) Applicant: SAMSUNG ELECTRO-MECHANICS CO., LTD., Suwon (KR)

(72) Inventors: Yong Il Kwon, Suwon (KR); Tah Joon Park, Suwon (KR); Byeong Hak Jo, Suwon (KR); Hyun Suk Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 316 days.

(21) Appl. No.: 13/893,733

(22) Filed: May 14, 2013

(65) Prior Publication Data

US 2014/0253491 A1 Sep. 11, 2014

(30) Foreign Application Priority Data

Mar. 7, 2013 (KR) ........................ 10-2013-0024480

(51) Int. Cl.
*G06F 3/041* (2006.01)
*G06F 3/045* (2006.01)
*G06F 3/044* (2006.01)

(52) U.S. Cl.
CPC ...... *G06F 3/044* (2013.01); *G06F 2203/04107* (2013.01)

(58) Field of Classification Search
CPC .................................................... G06F 3/044
USPC ................................... 345/173–174; 324/679
See application file for complete search history.

(56) References Cited

U.S. PATENT DOCUMENTS

| 6,075,520 | A | * | 6/2000 | Inoue | G06F 3/044 |
| | | | | | 178/18.01 |
| 2009/0009486 | A1 | | 1/2009 | Sato et al. | |
| 2010/0079384 | A1 | * | 4/2010 | Grivna | 345/173 |
| 2011/0187390 | A1 | * | 8/2011 | Lin et al. | 324/679 |

(Continued)

FOREIGN PATENT DOCUMENTS

| KR | 10-2009-0004678 | 1/2009 |
| KR | 10-2011-0103790 | 9/2011 |

(Continued)

OTHER PUBLICATIONS

Korean Office Action issued Apr. 14, 2014 in corresponding Korean Patent Application No. 10-2013-0024480.
Korean Office Action issued Oct. 27, 2014 in corresponding Korean Patent Application No. 10-2013-0024480.

*Primary Examiner* — Temesgh Ghebretinsae
*Assistant Examiner* — Hang Lin
(74) *Attorney, Agent, or Firm* — NSIP Law

(57) ABSTRACT

There are provided a touch sensing device and a touchscreen device, the touch sensing device including a plurality of driving electrodes extended in a first axial direction, a plurality of sensing electrodes extended in a second axial direction intersecting with the first axial direction, an integrating circuit unit generating a first analog signal by integrating a change in capacitance generated in a first sensing electrode among the plurality of sensing electrodes and generating a second analog signal from a change in capacitance generated in a second sensing electrode adjacent to the first sensing electrode, and a subtracting unit calculating a difference in levels between the first and second analog signals.

11 Claims, 7 Drawing Sheets

(56) References Cited

U.S. PATENT DOCUMENTS

| | | | |
|---|---|---|---|
| 2011/0221399 A1* | 9/2011 | Sawataishi et al. | 320/166 |
| 2011/0273400 A1 | 11/2011 | Kwon et al. | |
| 2013/0038570 A1* | 2/2013 | Seo et al. | 345/174 |
| 2013/0257785 A1* | 10/2013 | Brown et al. | 345/174 |

FOREIGN PATENT DOCUMENTS

| | | |
|---|---|---|
| KR | 10-2011-0126026 | 11/2011 |
| KR | 10-1108702 | 1/2012 |
| KR | 10-2012-0111673 | 10/2012 |

* cited by examiner

TOUCH SENSING DEVICE AND TOUCHSCREEN DEVICE

CROSS-REFERENCE TO RELATED APPLICATIONS

This application claims the priority of Korean Patent Application No. 10-2013-0024480 filed on Mar. 7, 2013, in the Korean Intellectual Property Office, the disclosure of which is incorporated herein by reference.

BACKGROUND OF THE INVENTION

1. Field of the Invention

The present invention relates to a touch sensing device and a touchscreen device capable of effectively removing noise introduced into a touchscreen panel.

2. Description of the Related Art

In general, a touch sensing device such as a touchscreen, a touch pad, or the like, an input means attached to a display apparatus to provide an intuitive input method to a user, has recently been widely used in various electronic devices such as cellular phones, personal digital assistants (PDAs), navigation devices, and the like. Particularly, as the demand for smartphones has recently increased, the use of a touchscreen as a touch sensing device capable of providing various input methods in a limited form factor has correspondingly increased.

Touchscreens used in portable devices may mainly be divided into resistive type touchscreens and capacitive type touchscreens according to a method of sensing a touch input implemented therein. Here, the capacitive type touchscreen has advantages in that it has a relatively long lifespan and various input methods and gestures may be easily used therewith, such that the use thereof has increased. Particularly, capacitive type touchscreens may more easily allow for a multi-touch interface as compared with resistive type touchscreens, such that they are widely used in devices such as smartphones, and the like.

Capacitive type touchscreens include a plurality of electrodes having a predetermined pattern and defining a plurality of nodes in which capacitance changes are generated by a touch input. In the plurality of nodes distributed on a two-dimensional plane, a self-capacitance or mutual-capacitance change is generated by the touch input. A coordinate of the touch input may be calculated by applying a weighted average method, or the like, to the capacitance change generated in the plurality of nodes. In order to accurately calculate the coordinate of the touch input, a technology capable of accurately sensing the capacitance change generated by the touch input is required. However, in the case in which electrical noise is generated in a wireless communications module, a display apparatus, or the like, a capacitance change may be hindered from being accurately sensed.

In the following Related Art Document (Patent Document 1), which relates to an integrating circuit in which an inverting integrating circuit and a non-inverting integrating circuit are combined with each other, two operational amplifiers are connected to each of a plurality of electrodes, such that volumes and areas thereof are increased. Further, in Patent Document 1, signals having opposite phases are applied to inverting terminals of two operational amplifiers, respectively, in order to remove noise. However, in the case in which a frequency of the noise is the equivalent of or a multiple of an operation frequency, the noise may not be effectively removed.

RELATED ART DOCUMENT (Patent Document 1) Korean Patent Laid-Open Publication No. 10-2011-0126026

SUMMARY OF THE INVENTION

An aspect of the present invention provides a touch sensing device and a touchscreen device in which node capacitors formed in adjacent sensing electrodes, among a plurality of node capacitors, are charged with voltages having opposite polarities to detect changes in capacitance and calculate a difference in levels between voltages corresponding to the changes in capacitance.

According to an aspect of the present invention, there is provided a touch sensing device including: a plurality of driving electrodes extended in a first axial direction; a plurality of sensing electrodes extended in a second axial direction intersecting with the first axial direction; an integrating circuit unit generating a first analog signal by integrating a change in capacitance generated in a first sensing electrode among the plurality of sensing electrodes and generating a second analog signal from a change in capacitance generated in a second sensing electrode adjacent to the first sensing electrode; and a subtracting unit calculating a difference in levels between the first and second analog signals.

The integrating circuit unit may integrate the change in capacitance generated in the first sensing electrode and the change in capacitance generated in the second sensing electrode to have opposite polarities.

The subtracting unit may calculate the difference in levels between the first and second analog signals to output a voltage having a positive polarity.

In the first and second analog signals, polarities of voltages may be changed after a reset section of the integrating circuit unit.

The touch sensing device may further include a driving circuit unit applying a predetermined driving signal to each of the plurality of driving electrodes.

According to another aspect of the present invention, there is provided a touchscreen device including: a panel unit including a plurality of driving electrodes, a plurality of sensing electrodes, and a plurality of node capacitors formed in intersections between the plurality of driving electrodes and the plurality of sensing electrodes; a driving circuit unit applying a driving signal having a predetermined driving period to each of the plurality of driving electrodes; a sensing circuit unit connected to the plurality of sensing electrodes to detect changes in capacitance in the plurality of node capacitors; and a signal processing unit converting an output of the sensing circuit unit into a digital signal to determine a touch input, wherein the sensing circuit unit calculates a difference between changes in capacitance in node capacitors formed in the sensing electrodes adjacent to each other among the plurality of node capacitors.

The sensing circuit unit may charge a plurality of the node capacitors formed in one sensing electrode of the sensing electrodes adjacent to each other and a plurality of the node capacitors formed in the other sensing electrode thereof with voltages having opposite polarities.

The sensing circuit unit may include: a plurality of integrating circuits connected to the plurality of sensing electrodes, respectively; a voltage setting unit setting polarities of voltages charged in the node capacitors formed in the sensing electrodes adjacent to each other to be opposed to each other; and a subscribing unit calculating a difference in levels between output voltages of the integrating circuits connected to the sensing electrodes adjacent to each other, respectively.

The signal processing unit may include: a signal converting unit converting the output of the sensing circuit unit into a digital signal; and a calculating unit determining the touch input from the digital signal.

The calculating unit may determine at least one of a gesture motion due to the touch input and the number of touch inputs.

The driving circuit unit may apply predetermined first and second voltages at different timings, and the voltage setting unit may select one of the first voltage and a predetermined third voltage to set the polarities of the voltages charged in the node capacitors formed in the sensing electrodes adjacent to each other to be opposed to each other.

the first voltage, the second voltage, and the third voltage may satisfy the following conditional equation:

$$V1-V2=\Delta V \text{ and } V3-V2=\Delta V \quad \text{[Conditional Equation]}$$

where V1 indicates the first voltage, V2 indicates the second voltage, and V3 indicates the third voltage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
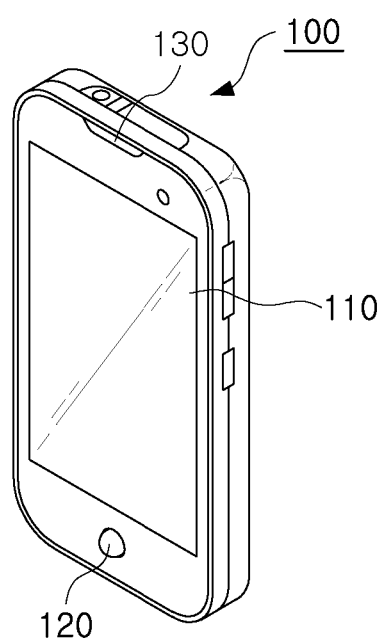
FIG. 1 is a perspective view illustrating the exterior of an electronic apparatus including a touch sensing device according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a perspective view illustrating the exterior of an electronic apparatus including a touch sensing device according to an embodiment of the present invention.

Referring to FIG. 1, an electronic apparatus 100 according to the present embodiment may include a display device 110 for outputting a screen therethrough, an input unit 120, an audio unit 130 for outputting a sound and the like, and may be integrated with the display device 110 to provide a touch sensing device.

As shown in FIG. 1, in general, a mobile device may be configured in such a manner that a touch sensing device is integrated with a display device, and the touch sensing device may have a high degree of light transmissivity to which an image passes through a screen displayed on the display device. Thus, the touch sensing device may be manufactured by forming a sensing electrode on a base substrate formed of a transparent film material such as polyethylene terephthalate (PET), polycarbonate (PC), polyethersulfone (PES), polyimide (PI) or the like, the sensing electrode being formed of an electrically conductive material such as indium-tin oxide (ITO), indium zinc oxide (IZO), zinc oxide (ZnO), carbon nanotubes (CNT) or graphene. A wiring pattern connected to the sensing electrode formed of a transparent conductive material is formed in a bezel region of the display device. Since the wiring pattern is visually shielded by the bezel region, the wiring pattern may also be formed of a metal such as silver (Ag), copper (Cu), or the like.

The touch sensing device according to an embodiment of the present invention may be a capacitive type touch sensing device and accordingly, it may include a plurality of electrodes having a predetermined pattern. Also, the touch sensing device according to an embodiment of the present invention may include a capacitance detection circuit detecting changes in capacitance generated in the plurality of electrodes, an analog-to-digital conversion circuit converting an output signal from the capacitance detection circuit into a digital value, an operation circuit determining a touch input by using data converted as the digital value, and the like.

Figure 2:
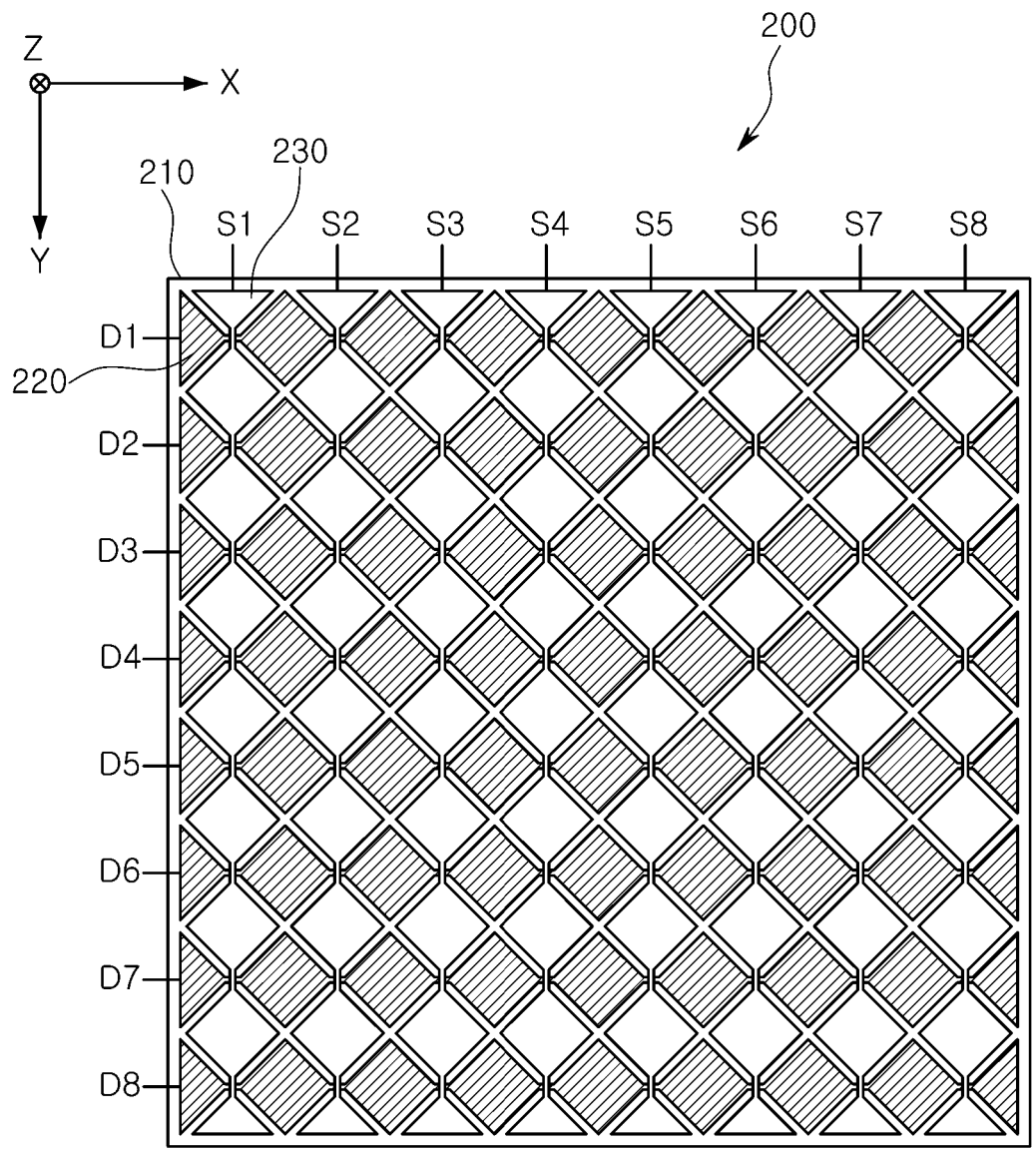
FIG. 2 is a view illustrating a panel unit capable of being included in the touch sensing device according to the embodiment of the present invention.

FIG. 2 is a view illustrating a panel unit capable of being included in the touch sensing device according to the embodiment of the present invention.

Referring to FIG. 2, a panel unit 200 according to the present embodiment includes a substrate 210 and a plurality of electrodes 220 and 230 provided on the substrate 210. Although not shown in FIG. 2, the plurality of respective electrodes 220 and 230 may be respectively electrically connected with wiring patterns of a circuit board, which is bonded to one end of the substrate 210, through wirings and bonding pads. A controller integrated circuit is mounted on the circuit board to detect a sensing signal generated from the plurality of electrodes 220 and 230 and determine a touch input from the sensing signal.

In the case of a touchscreen device, the substrate 210 may be a transparent substrate on which the plurality of electrodes 220 and 230 are formed, and may be formed of a plastic material such as polyimide (PI), polymethylmethacrylate (PMMA), polyethyleneterephthalate (PET), or polycarbonate (PC), or tempered glass. Further, with respect to a region in which the wirings connected to the plurality of electrodes 220 and 230 are formed, except for a region in which the plurality of electrodes 220 and 230 are formed, a predetermined printing region may be formed on the substrate 210 in order to visually shield the wirings generally formed of an opaque metal material.

The plurality of electrodes 220 and 230 may be provided on one surface or both surfaces of the substrate 210. The touchscreen device may be formed of indium tin-oxide (ITO), indium zinc-oxide (IZO), zinc oxide (ZnO), carbon nano tube (CNT), a graphene based material, or the like, having transparency and conductivity. In FIG. 2, the plurality of electrodes 220 and 230 having a diamond-like pattern are illustrated, but the present invention is not limited thereto and the electrodes 220 and 230 may have various polygonal patterns such as a rectangular pattern, a triangular pattern, or the like.

The plurality of electrodes 220 and 230 include first electrodes 220 extending in an X-axis direction and second electrodes 230 extending in a Y-axis direction. The first electrodes 220 and the second electrodes 230 may intersect each other on both surfaces of the substrate 210, or on different substrates 210. In the case in which the first electrodes 220 and the second electrodes 230 are all formed on one surface of the substrate 210, predetermined insulating layers may be partially formed in intersections between the first electrodes 220 and the second electrodes 230.

The touch sensing device, electrically connected to the plurality of sensing electrodes 220 and 230 to sense a touch input, may detect changes in capacitance generated from the plurality of electrodes 220 and 230 according to a touch input applied thereto and sense the touch input therefrom. The first electrodes 220 may be connected to channels defined as D1 to D8 in the controller integrated circuit to thereby be applied with predetermined driving signals, and the second electrodes 230 may be connected to channels defined as S1 to S8 to thereby be used for the touch sensing device to detect a sensing signal. Here, the controller integrated circuit may detect, as a sensing signal, changes in mutual-capacitance generated between the first electrodes 220 and the second electrodes 230, and may be operated in such a manner that driving signals are sequentially applied to the respective first electrodes 220 and the changes in capacitance are simultaneously detected by the second electrodes 230.

Figure 3:
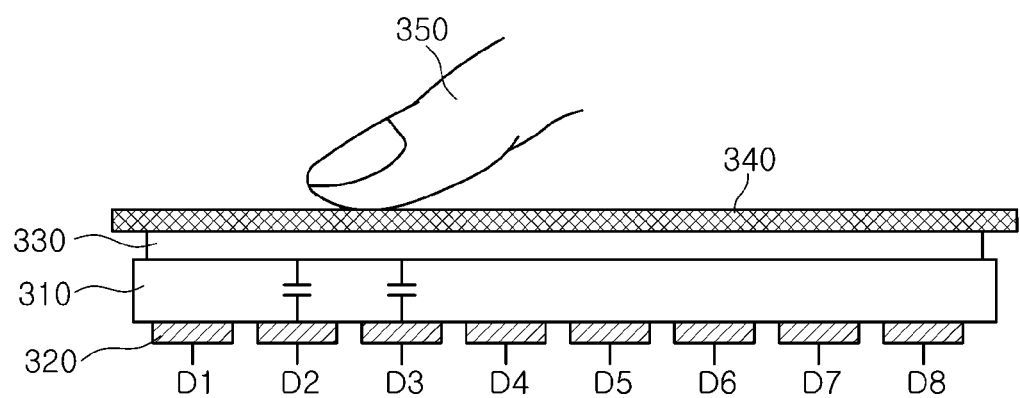
FIG. 3 is a cross-sectional view of the panel unit illustrated in FIG. 2.

FIG. 3 is a cross-sectional view of the panel unit illustrated in FIG. 2. FIG. 3 is a cross-sectional view of the panel unit 200 illustrated in FIG. 2, taken along Y-Z plane, and the panel unit 200 may include a substrate 310 and a plurality of sensing electrodes 320 and 330 as described above with reference to FIG. 2 and further include a cover lens 340 receiving contact. The cover lens 340 may be disposed on the second electrode 330 used for detecting a sensing signal and receive a touch input from a contact object 350 such as a finger, or the like.

When driving signals are sequentially applied to the first electrodes 320 through the channel D1 to D8, mutual capacitance may be generated between the first electrodes 320 to which the driving signals are applied and the second electrode 330. When the driving signals are sequentially applied to the first electrodes 320, changes in mutual capacitance generated between the first electrodes 320 and the second electrode 330 adjacent to a region with which the contact object 350 is brought into contact may be caused. The changes in capacitance may be proportional to the area of an overlapping region between the contact object 350 and the first electrodes 320 to which the driving signals are applied and the second electrode 330. In FIG. 3, mutual capacitance generated between the first electrodes 320 and the second electrode 330 connected to the channels D2 and D3 is affected by the contact object 350.

Figure 4:
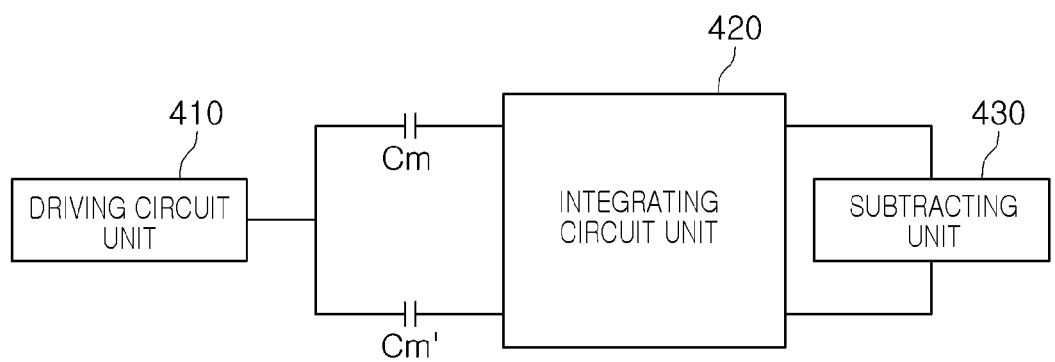
FIG. 4 is a block diagram of a touch sensing device according to an embodiment of the present invention.

FIG. 4 is a block diagram of a touch sensing device according to an embodiment of the present invention. Referring to FIG. 4, the touch sensing device according to the embodiment may include a driving circuit unit 410, an integrating circuit unit 420, and a subtracting unit 430. Capacitors Cm and Cm' in which changes in capacitance to be measured are generated may be connected between the driving circuit unit 410 and the integrating circuit unit 420. The capacitors Cm and Cm' may correspond to capacitors in which capacitance to be measured by the capacitance sensing device according to the embodiment is charged. As an example, the capacitors Cm and Cm' may correspond to mutual capacitance generated between a plurality of electrodes included in a capacitive type touchscreen. Hereinafter, for convenience of explanation, it is assumed that the touch sensing device according to the embodiment senses changes in capacitance generated in the capacitive type touchscreen. In this case, the capacitors Cm and Cm' may correspond to node capacitors in or from which charges are charged or discharged by changes in the mutual capacitance generated in intersections between the plurality of electrodes.

Meanwhile, the node capacitors Cm and Cm' shown in FIG. 4 may correspond to node capacitors formed in the second electrodes 230 adjacent to each other in FIG. 2. For example, in FIG. 2, a node capacitor formed between an electrode connected to the channel S1 and an electrode connected to the channel D8 and a node capacitor formed between an electrode connected to the channel S2 and an electrode connected to the channel D8 may correspond to Cm and Cm', respectively.

The driving circuit unit 410 may generate a predetermined driving signal for storing charges in the node capacitors Cm and Cm' and supply the generated driving signal to the node capacitors Cm and Cm'. The driving signal may be a square wave signal having a pulse form and may have a predetermined frequency.

The integrating circuit unit 420 may include at least one feedback capacitor, receiving the charges stored in the node capacitors Cm and Cm' to thereby be charged or discharged. The integrating circuit unit 420 may generate an output voltage from the charges charged in or discharged from the feedback capacitor. Here, the integrating circuit unit 420 may provide voltages to the node capacitors Cm and Cm' such that polarities of voltages charged in the node capacitors Cm and Cm' are different and may integrate the voltages charged in the node capacitors Cm1 and Cm2 to generate output voltages.

The subtracting unit 430 may calculate a difference in levels between the voltages output from the integrating circuit unit 420. Noise may be introduced into the voltages output from the integrating circuit unit 420. This noise may be effectively removed by calculating the difference in levels between the voltages generated from the node capacitors Cm and Cm' adjacent to each other.

Figure 5:
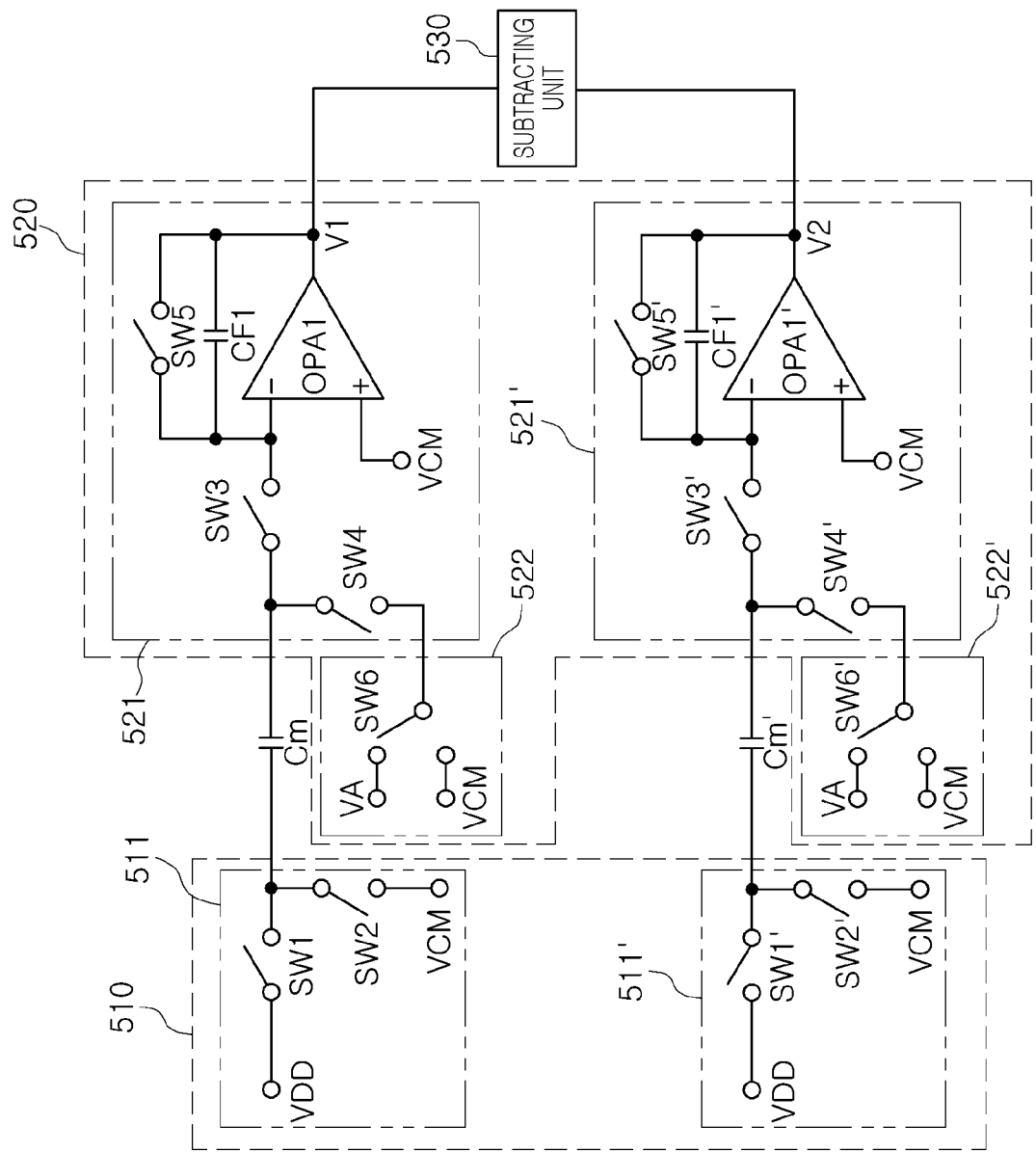
FIG. 5 is a circuit diagram of a touch sensing device according to an embodiment of the present invention.

FIG. 5 is a circuit diagram of a touch sensing device according to an embodiment of the present invention. Referring to FIG. 5, the touch sensing device according to the embodiment may include a driving circuit unit 510, an integrating circuit unit 520, and a subtracting unit 530. Similarly to FIG. 4, the capacitors Cm and Cm' may correspond to node capacitors formed in electrodes adjacent to each other in the capacitive type touchscreen.

The driving circuit unit 510 may include a driving circuit 511 configured of switches SW1 and SW2. The switch SW1 may be disposed between a first node of the node capacitor Cm and a driving voltage (VDD) terminal, and the switch SW2 may be disposed between the first node of the node capacitor Cm and a common voltage (VCM) terminal. Here, the switches SW1 and SW2 may be switched at different times to transfer a driving signal to the node capacitor Cm. In the embodiment, the common voltage VCM generally has a level equal to an intermediate level of the driving voltage VDD, but is not limited thereto. That is, the common voltage VCM may also have a ground GND level.

The integrating circuit unit 520 may include an integrating circuit 521 and a voltage setting unit 522. The integrating circuit 521 may include an operational amplifier OPA1, a feedback capacitor CF1, and switches SW3, SW4, and SW5. The switch SW3 may be disposed between a second node of the node capacitor Cm and an inverting terminal of the operational amplifier OPA1, and the switch SW4 may be disposed between the second node of the node capacitor Cm and the voltage setting unit 522. The switch SW5 may be disposed between the inverting terminal and an output terminal of the operational amplifier OPA1, and the feedback capacitor CF1 may be connected to the switch SW5 in parallel. A non-inverting terminal of the operational amplifier OPA1 may be connected to the common voltage VCM terminal. Charges stored in the node capacitor Cm may be integrated by the feedback capacitor CF1 and the operational amplifier OPA1 and be then output as an output voltage V1 from the output terminal of the operational amplifier OPA1, through switching operations of the switches SW1 to SW5. The output voltage V1 may be determined depending on capacitance of the capacitor Cm and the capacitor CF1. Therefore, the capacitor CF1 may be configured to have capacitance higher than that of the capacitor Cm in which charges to be measured are stored, thereby preventing the output voltage V1 from being saturated.

The voltage setting unit 522 may include a switch SW6 connected to the switch SW4 of the integrating circuit 521. The switch SW6 may be connected to at least one of voltage terminals supplying a voltage VA and a voltage VCM to set a polarity of the voltage charged in the node capacitor Cm. Here, the voltages VA, VDD, and VCM may have the following relationships: VA−VDD=ΔV and VDD−VCM=ΔV.

Since configurations and connection relationships of circuits of a driving circuit 511', an integrating circuit 521', and a voltage setting unit 522' are similar to those of the driving circuit 511, the integrating circuit 521, and the voltage setting unit 522, a description of a similar portion will be omitted and different portions may be described below.

Figure 6:
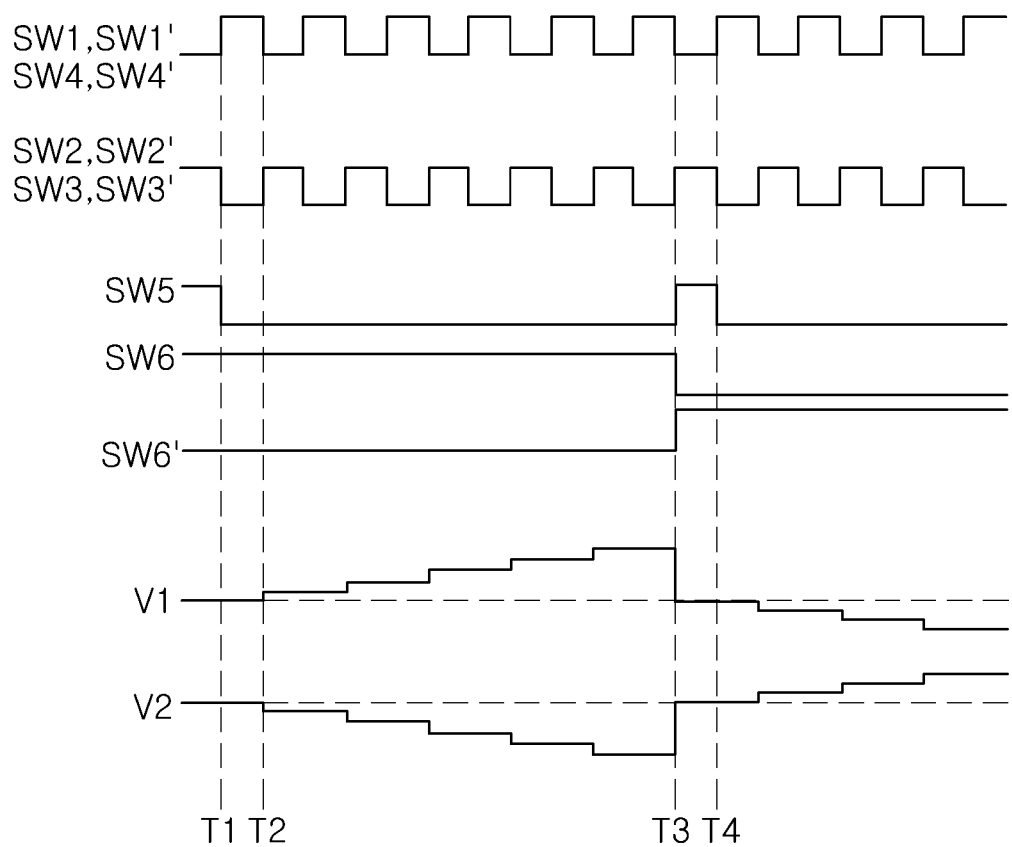
FIG. 6 is a diagram for describing clock signals applied to switches included in the touch sensing device according to the embodiment of the present invention and output voltages generated by switching operations according to the clock signals.

FIG. 6 is a diagram for describing clock signals applied to switches included in the touch sensing device according to the embodiment of the present invention and output voltages generated by switching operations according to the clock signals. In the case in which a clock signal applied to the switches SW1 to SW5 or SW1' to SW5' has a high level, the switches may be turned on, and in the case in which the clock signal has a low level, the switches may be turned off. In addition, in the case in which a clock signal applied the switches SW6 and SW6' has a high level, the switches may be connected to a voltage terminal supplying the voltage VCM, and in the case in which the clock signal has a low level, the switches may be connected to a voltage terminal supplying the voltage VA. Hereinafter, an operation of the touch sensing device according to the embodiment of the present invention will be described in detail with reference to FIGS. 5 and 6.

At a point in time T1, the switches SW1 and SW4 are turned on, and the switches SW2 and SW3 are turned off. In this case, SW6 is connected to the voltage terminal supplying the voltage VCM, such that charges corresponding to (VDD−VCM) are stored in the capacitor Cm. At a point in time T2, the switches SW1 and SW4 are turned off and the switches SW2 and SW3 are turned on, such that the charges stored in the node capacitor Cm in an amount corresponding to the amount of (VDD−VCM) are integrated by the operational amplifier OPA1 and the feedback capacitor CF1 and are then output. An increment ΔV1 of the voltage V1 output from the operational amplifier OPA1 by a switching operation at the points in time T1 and T2 may be represented by the following Equation 1. Here, Vnoise equivalently represents introduced noise.

$$\Delta V1 = \frac{Cm}{CF1}(VDD - VCM + Vnoise) \quad \text{[Equation 1]}$$

$$\Delta V1 = \frac{Cm}{CF1}(\Delta V + Vnoise)$$

In addition, at the point in time T1, the switches SW1' and SW4' are turned on, and the switches SW2' and SW3' are turned off. In this case, SW6' is connected to the voltage terminal supplying the voltage VA, such that charges corresponding to (VDD−VA) are stored in the capacitor Cm'. At the point in time T2, the switches SW1' and SW4' are turned off and the switches SW2' and SW3' are turned on, such that the charges stored in the node capacitor Cm' in an amount corresponding to the amount of (VDD−VA) are integrated by the operational amplifier OPA1' and the feedback capacitor CF1' and are then output. An increment ΔV2 of the voltage V2 output from the operational amplifier OPA1' by a switching operation at the points in time T1 and T2 may be represented by the following Equation 2.

$$\Delta V2 = \frac{Cm'}{CF1'}(VDD - VA + Vnoise) \quad \text{[Equation 2]}$$

$$\Delta V2 = \frac{Cm'}{CF1'}(-\Delta V + Vnoise)$$

Then, in the case in which the same operation as the operation performed at the points in time T1 and T2 is repeated a plurality of times, for example, N times, up to a point in time T3, the increments ΔV1 and ΔV2 of the final voltage may be represented by the following Equation 3.

$$\Delta V1 = \frac{Cm}{CF1}(\Delta V + Vnoise) * N \quad \text{[Equation 3]}$$

$$\Delta V2 = \frac{Cm'}{CF1'}(-\Delta V + Vnoise) * N$$

At the point in time T3, SW1, SW1', SW4, and SW4' are turned off and SW2, SW2', SW3, SW3', SW5, and SW5' are turned on, such that the feedback capacitors CF1 and CF1' are reset and output terminals of the operational amplifiers OPA1 and OPA1' output the common voltage VCM.

Meanwhile, the subtracting unit 530 may calculate a difference in levels between increments ΔV1 and ΔV2 of the final voltage in a reset section, that is, a section of T3 to T4, of the integrating circuit unit 520 to generate a final output voltage. In this case, the subtracting unit 530 may calculate the difference in levels between ΔV1 and ΔV2 to output a voltage having a positive polarity. An increment ΔVo of a voltage Vo output from the subtracting unit 530 may be represented by the following Equation 4.

$$\Delta Vo = \Delta V1 - \Delta V2 \quad \text{[Equation 4]}$$

$$= \frac{Cm}{CF1}(\Delta V + Vnoise) * N -$$

$$\left(\frac{Cm'}{CF1'}(-\Delta V + Vnoise) * N\right)$$

$$= \frac{Cm}{CF1}(\Delta V) * 2N$$

Here, it may be confirmed that in the case in which capacitances of Cm and Cm' are the same as each other and capacitances of CF1 and CF1' are the same as each other, noise is removed.

Meanwhile, the clock signal applied to the switches SW6 and SW6' is inverted at the point in time T3, such that V1 has a voltage level having a positive polarity and V2 has a voltage level of a negative polarity, in a second operation section, that is, a section from the point in time T4 to the next reset point in time, unlike a first operation section, that is, a section of T1 to T3.

Figure 7A:
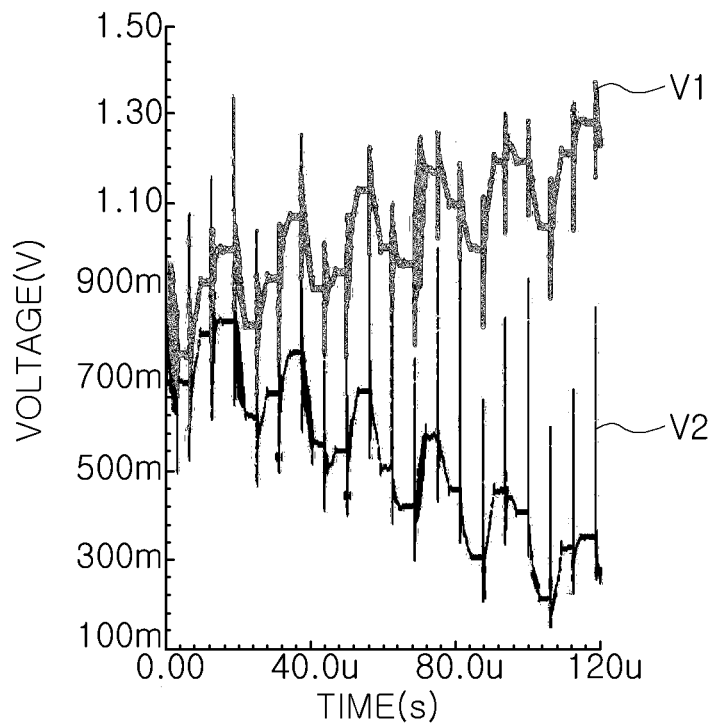
FIGS. 7A and 7B are graphs of simulation results according to the embodiment of the present invention.
Figure 7B:
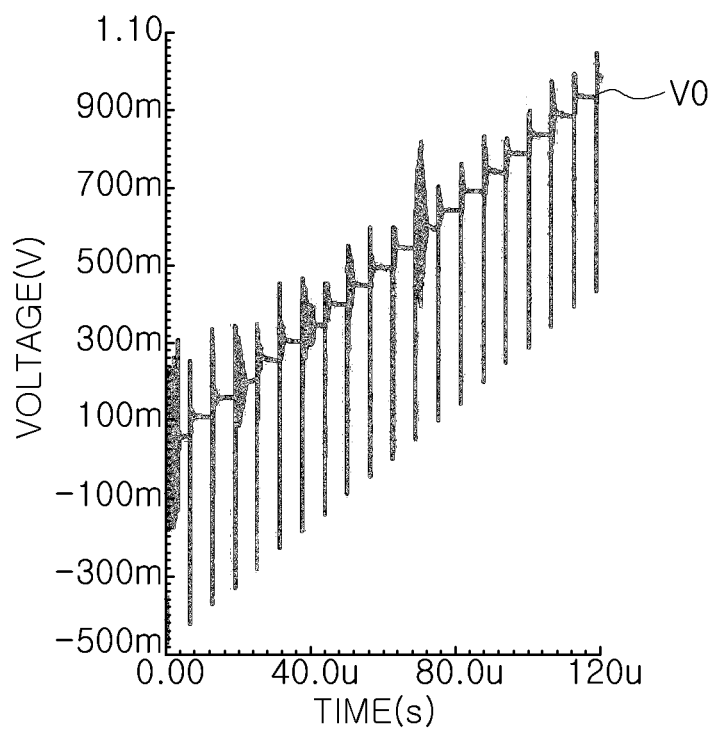

FIGS. 7A and 7B are graphs of simulation results according to the embodiment of the present invention. FIG. 7A is a graph showing the output voltages V1 and V2 of the integrating circuits 521 and 521' of FIG. 5 in the case in which noise is introduced; and FIG. 7B is a graph showing the output voltage Vo of the subtracting unit 530 of FIG. 5 in the case in which the noise is introduced.

It may be appreciated from FIG. 7A that in the case in which the noise is introduced, voltage levels of the voltages V1 and V2 are distorted due to the noise, rather than being maintained at a constant voltage level. On the other hand, it may be appreciated from FIG. 7B that in spite of an influence of the noise, a constant voltage is output by calculating the difference in levels between the voltages V1 and V2. That is, it may be confirmed that the influence of the noise is removed.

Figure 8:
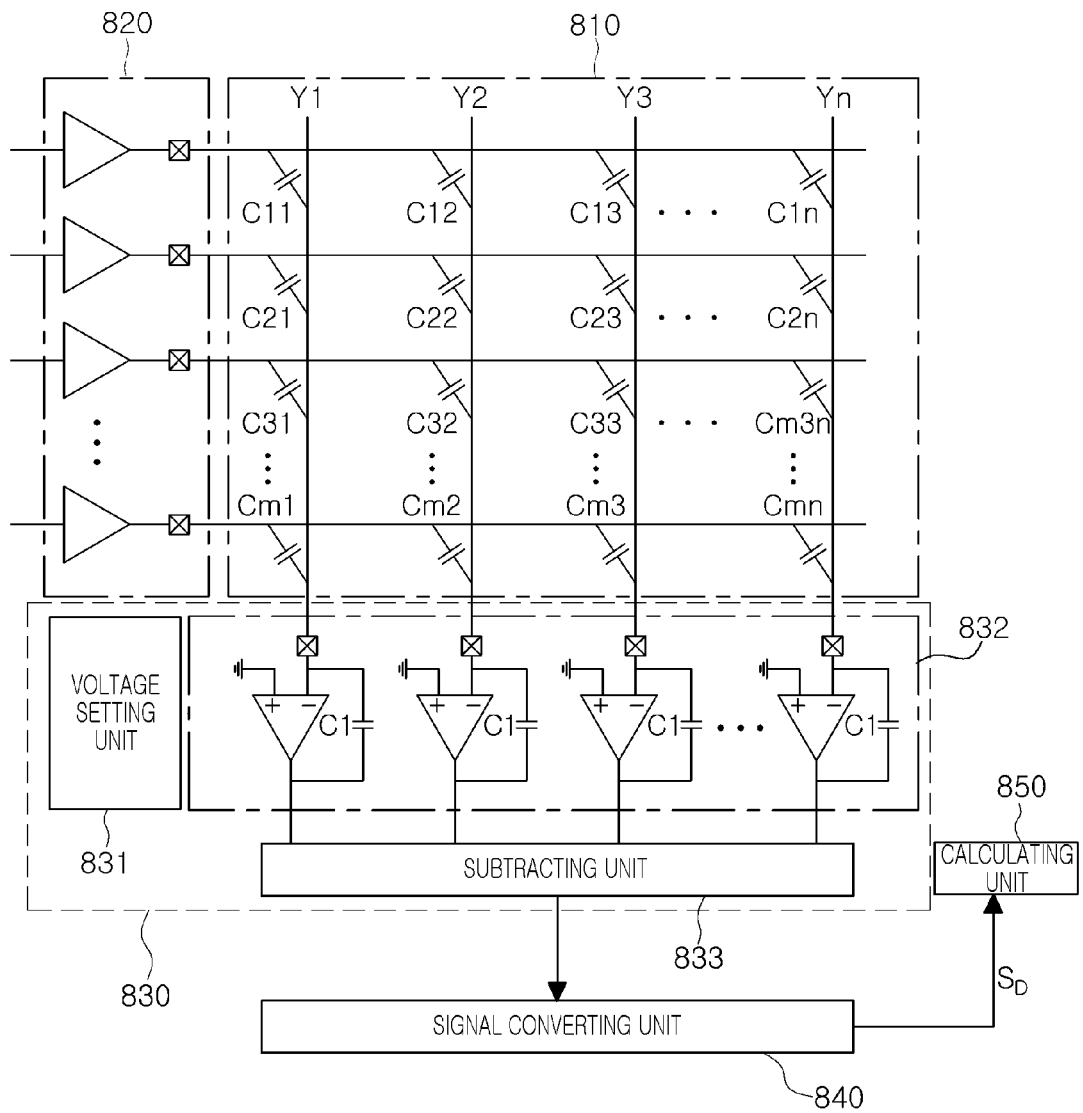
FIG. 8 is a view showing a touchscreen device including a capacitance sensing device according to an embodiment of the present invention.

FIG. 8 is a view showing a touchscreen device including a capacitance sensing device according to an embodiment of the present invention.

Referring to FIG. 8, the touchscreen device according to the present embodiment may include a panel unit 810, a driving circuit unit 820, a sensing circuit unit 830, a signal converting unit 840, and a calculating unit 850. The panel unit 810 may include a plurality of first electrodes extended in a first axial direction, that is, a horizontal direction of FIG. 8 and a plurality of second electrodes extended in a second axial direction, that is, a vertical direction of FIG. 8, intersecting with the first axial direction. Changes in capacitance C11 to Cmn are generated in intersections between the first and second electrodes. The changes in capacitance C11 to Cmn generated in the intersections between the first and second electrodes may be changes in mutual capacitance generated by driving signals applied to the first electrodes from the driving circuit unit 820. Meanwhile, the driving circuit unit 820, the sensing circuit unit 830, the signal converting unit 840, and the calculating unit 850 may be implemented as a single integrated circuit (IC).

The driving circuit unit 820 may apply predetermined driving signals to the first electrodes of the panel unit 810. The driving signals may be square wave signals, sine wave signals, triangle wave signals, or the like, having a predetermined period and amplitude and be sequentially applied to each of the plurality of first electrodes. Although the case in which circuits for generating and applying the driving signals are individually connected to the plurality of first electrodes, respectively, is shown in FIG. 8, a single driving signal generating circuit may also generate driving signals and apply the generated driving signals to the plurality of first electrodes, respectively, using a switching circuit.

The sensing circuit unit 830 may include a voltage setting unit 831, an integrating circuit 832, and a subtracting unit 833. Since the voltage setting unit 831, the integrating circuit 832, and the subtracting unit 833 of FIG. 8 correspond to the voltage setting units 522 and 522', the integrating circuits 521 and 521', and the subtracting units 430 and 530 of FIGS. 4 and 5, respectively, a description thereof will be omitted. The voltage setting unit 831 may store voltages having opposite polarities in node capacitors in second electrodes adjacent to each other among a plurality of second electrodes. The integrating circuit 832 may include at least one operational amplifier for sensing changes in capacitance from the second electrodes and a capacitor C1 having a predetermined level of capacitance, and in this case, the operational amplifier has an inverting input terminal connected to the second electrodes to convert the changes in capacitance into analog signals such as voltage signals, or the like, and then output the analog signals. In the case in which the driving signals are sequentially applied to the plurality of first electrodes, respectively, since the changes in capacitance may be simultaneously detected from the plurality of second electrodes, the integrating circuit may correspond to the number of second electrodes, that is, the number of n. A difference in levels between the analog signals output from the integrating circuits connected to the second electrodes adjacent to each other may be calculated by the subtracting unit 833, such that a voltage from which noise has been removed may be output.

The subtracting unit 833 may not only calculate a difference in levels between analog signals generated from the changes in capacitance generated in second electrodes adjacent to each other, for example, a difference in levels between analog signals generated based on electrodes Y1 and Y2 and a difference in levels between analog signals generated based on electrodes Y2 and Y3, but also allow second electrodes adjacent to each other among the plurality of second electrodes to be paired and calculate a difference generated from the pairs of second electrodes, for example, a difference in levels between analog signals generated based on electrodes Y1 and Y2 and a difference in levels between analog signals generated based on electrodes Y3 and Y4.

The signal converting unit 840 may generate a digital signal $S_D$ from the output voltage generated from the subtracting unit 833. For example, the signal converting unit 840 may include a time-to-digital converter (TDC) circuit for measuring a period of time for which a voltage output from the sensing circuit unit 430 reaches a predetermined reference voltage level and converting the period of time into the digital signal $S_D$ or an analog-to-digital converter (ADC) circuit for measuring an amount by which a level of the voltage output from the sensing circuit unit 430 is changed for a predetermined period of time and converting the amount into the digital signal $S_D$.

The calculating unit 850 may determine a touch input applied to the panel unit 810 using the digital signal $S_D$. As an example, the calculating unit 850 may determine the number of touch inputs applied to the panel unit 810, coordinates of the touch input, a gesture based on the touch input, or the like.

Comparing the touchscreen device of FIG. 8 with the touch sensing device shown in FIGS. 4 and 5, node capacitors C11 to Cmn provided in intersections between the first and second electrodes may correspond to the node capacitors Cm and Cm' of FIGS. 4 and 5. In addition, the driving circuit unit 820 of FIG. 8 may correspond to the driving circuit units 410 and 510 of FIGS. 4 and 5, and the sensing circuit unit 830 of FIG. 8 may be considered as a component including the integrating circuit units 420 and 520 and the subtracting units 430 and 530 of FIGS. 4 and 5.

As set forth above, according to the touch sensing device and the touchscreen device to the embodiments of the present invention, node capacitors formed in adjacent sensing electrodes among a plurality of node capacitors are charged with voltages having opposite polarities to detect changes in capacitance and calculate a difference between the changes in capacitance, whereby noise can be effectively removed.

While the present invention has been shown and described in connection with the embodiments, it will be apparent to those skilled in the art that modifications and variations can be made without departing from the spirit and scope of the invention as defined by the appended claims.

What is claimed is:

1. A touch sensing device comprising:
   a plurality of driving electrodes extended in a first axial direction;
   a plurality of sensing electrodes extended in a second axial direction intersecting with the first axial direction;
   an integrating circuit unit generating a first analog signal by integrating a change in capacitance generated in a first sensing electrode among the plurality of sensing electrodes and generating a second analog signal from a change in capacitance generated in a second sensing electrode adjacent to the first sensing electrode; and
   a subtracting unit calculating a difference in levels between the first and second analog signals, wherein in the first and second analog signals having opposing polarities, the integrating circuit unit inverts the polarities of the first and second analog signals by changing a positive polarity to a negative polarity for the first analog signal and changing a negative polarity to a positive polarity for the second analog signal in response to a reset section of the integrating circuit unit.

2. The touch sensing device of claim 1, wherein the integrating circuit unit integrates the change in capacitance generated in the first sensing electrode and the change in capacitance generated in the second sensing electrode to have opposite polarities.

3. The touch sensing device of claim 1, wherein the subtracting unit calculates the difference in levels between the first and second analog signals to output a voltage having a positive polarity.

4. The touch sensing device of claim 1, further comprising a driving circuit unit applying a predetermined driving signal to each of the plurality of driving electrodes.

5. A touchscreen device comprising:
   a panel unit including a plurality of driving electrodes, a plurality of sensing electrodes, and
   a plurality of node capacitors formed in intersections between the plurality of driving electrodes and the plurality of sensing electrodes;
   a driving circuit unit applying a driving signal having a predetermined driving period to each of the plurality of driving electrodes;
   a sensing circuit unit connected to the plurality of sensing electrodes to detect changes in capacitance in the plurality of node capacitors; and
   a signal processing unit converting an output of the sensing circuit unit into a digital signal to determine a touch input, wherein the sensing circuit unit calculates a difference between a first analog signal and second analog signal generated in changes in capacitance in node capacitors formed in the sensing electrodes adjacent to each other among the plurality of node capacitors, wherein in the first and second analog signals having opposing polarities, the integrating circuit unit inverts the polarities of the first and second analog signals by changing a positive polarity to a negative polarity for the first analog signal and changing a negative polarity to a positive polarity for the second analog signal in response to a reset section of the sensing circuit unit.

6. The touchscreen device of claim 5, wherein the sensing circuit unit charges a plurality of the node capacitors formed in one sensing electrode of the sensing electrodes adjacent to each other and a plurality of the node capacitors formed in the other sensing electrode thereof with voltages having opposite polarities.

7. The touchscreen device of claim 5, wherein the sensing circuit unit includes:
   a plurality of integrating circuits connected to the plurality of sensing electrodes, respectively;
   a voltage setting unit setting polarities of voltages charged in the node capacitors formed in the sensing electrodes adjacent to each other to be opposed to each other; and
   a subscribing unit calculating a difference in levels between output voltages of the integrating circuits connected to the sensing electrodes adjacent to each other, respectively.

8. The touchscreen device of claim 5, wherein the signal processing unit includes:
   a signal converting unit converting the output of the sensing circuit unit into a digital signal; and
   a calculating unit determining the touch input from the digital signal.

9. The touchscreen device of claim 8, wherein the calculating unit determines at least one of a gesture motion due to the touch input and the number of touch inputs.

10. The touchscreen device of claim 7, wherein the driving circuit unit applies predetermined first and second voltages at different times, and
    the voltage setting unit selects one of the predetermined first voltage and a predetermined third voltage to set the polarities of the voltages charged in the node capacitors formed in the sensing electrodes adjacent to each other to be opposed to each other.

11. The touchscreen device of claim 10, wherein the predetermined first voltage, the predetermined second voltage, and the predetermined third voltage satisfy the following conditional Equation:

$$V_1-V_2=\Delta V \text{ and } V_3-V_2=\Delta V \quad \text{[Conditional Equation]}$$

where V1 indicates the predetermined first voltage, V2 indicates the second voltage, and V3 indicates the predetermined third voltage.

* * * * *